(Model.)
L. PETREQUIN.
IRON FENCE AND TELEGRAPH POST.
No. 273,887. Patented Mar. 13, 1883.
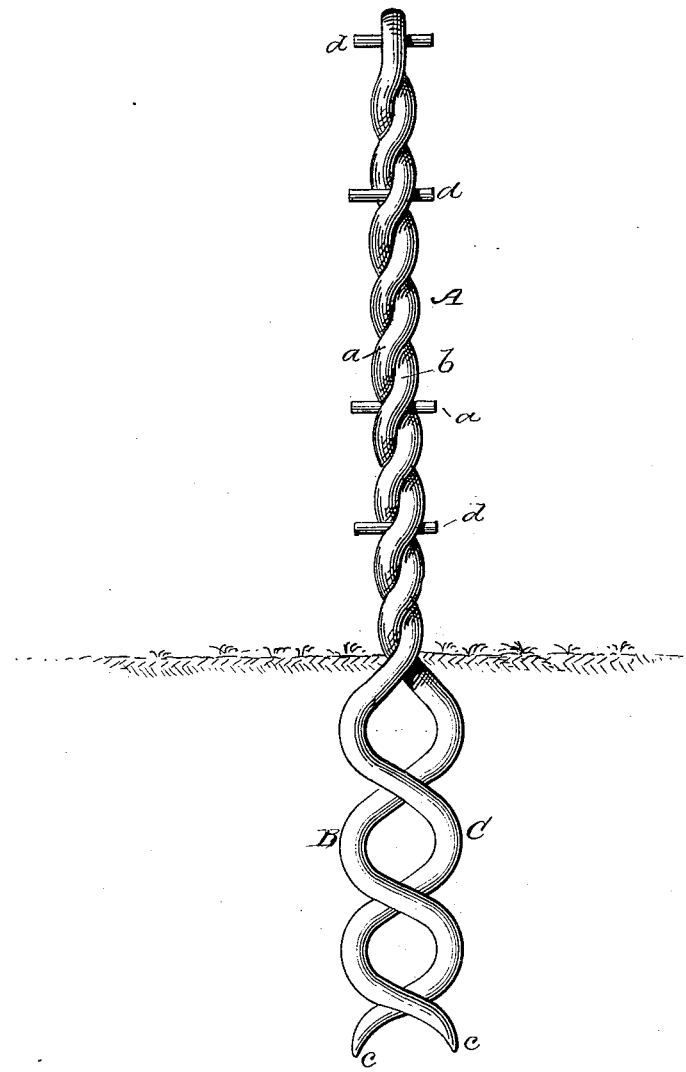
WITNESSES
INVENTOR
Louis Petrequin,
per Chas. H. Fowler
Attorney

UNITED STATES PATENT OFFICE.

LOUIS PETREQUIN, OF DETROIT, MICHIGAN.

IRON FENCE AND TELEGRAPH POST.

SPECIFICATION forming part of Letters Patent No. 273,887, dated March 13, 1883.

Application filed July 27, 1882. (Model.)

*To all whom it may concern:*

Be it known that I, LOUIS PETREQUIN, a citizen of the United States, residing at Detroit, in the county of Wayne and State of Michigan, have invented certain new and useful Improvements in Wire Posts for Fences, Telegraph-Wires, and other Purposes; and I do hereby declare that the following is a full, clear, and exact description of the same, reference being had to the accompanying drawing, which represents a wire post constructed in accordance with my invention.

The present invention has relation to certain new and useful improvements in that class of fence or other posts having at the lower end a spiral twist or screw-threads, to more securely hold the post in the ground.

Previous to my invention it was common to construct such posts from a solid piece of wrought metal, with a screw-threaded point, or its lower end twisted to form a spiral to enter the ground. It was also common to construct a post from two strands of wire twisted together, the strands at their lower ends being bent outward to form a bifurcated or forked end, so that when buried in the ground they will form a support for the post. It will be seen that the main object in so constructing the lower end of the post is to render it more firm and secure when placed in the ground, which is the object sought to be attained in the present invention by still further improving the construction of the post at its lower end, whereby still greater support is secured in holding it in an upright position when inserted in the ground by forcing its own way therein.

The invention therefore consists in providing the post, at the end which is to enter the ground, with a compound spiral screw, substantially as shown in the drawing and hereinafter described.

The post, as represented at A, is preferably formed of two rods or strands of wire, *a b*, which are twisted in spiral form around each other, to form the main shaft of the post. That portion of the post A which is to enter the ground, below the surface thereof, has a double spiral or compound spiral screw, as indicated at B C, the ends thereof being pointed, as shown at *c*, and adapted to penetrate the soil. This compound spiral screw is formed by a continuation of the strands or rods *a b*, twisted around each other in a manner that will render the lower end of the post, which enters the ground, of greater diameter than that portion of the post above the surface.

Although I have shown the post especially adapted for fences, it is evident that the invention may be applied to other class of posts, and when used as a telegraph-post the main shaft or portion above the ground is elongated and separated at the upper part, the ends of the rods or strands forming two arms at right angles to the body of the post, each arm having its extremity fitted with an insulator for the purpose of supporting the telegraph-wires. When used as a fence-post short pieces or bolts of iron may be inserted between the strands, as shown at *d*, upon which ordinary fencing-wire rests, and is secured from lateral vibration by a suitable wire tie.

In erecting these posts it is intended to sink them into the ground by applying a wrench or suitable tool to that portion of the volute of the spiral screw just above the surface of the ground and turning the post until it shall have sunk into the ground as far as desired.

Instead of a single spiral upon the lower end of the post, as heretofore, I have provided a double spiral, or what I term a "compound spiral screw," so that when inserted in the ground the post will be held firmer in an upright position and less liable to sag or get out of its true line.

Having now fully described my invention, what I claim as new, and desire to secure by Letters Patent, is—

1. A fence or other post having its lower end below the surface of the ground formed into a compound spiral screw of greater diameter than that portion of the post above the surface of the ground, substantially as and for the purpose set forth.

2. A fence or other post having the portion intended to be sunk below the surface of the ground formed of a double spiral screw, substantially as shown, and for the purpose specified.

3. A post having the portion above ground formed of closely-twisted rods or wires and the portion below ground formed of a continuation of the strands of wire or rods twisted around each other to form a compound spiral screw with a diameter larger than that of the main body of the post, substantially as shown and described.

LOUIS PETREQUIN.

Witnesses:
C. F. BURTON,
DAVID D. OLIVER.